Figure 1:
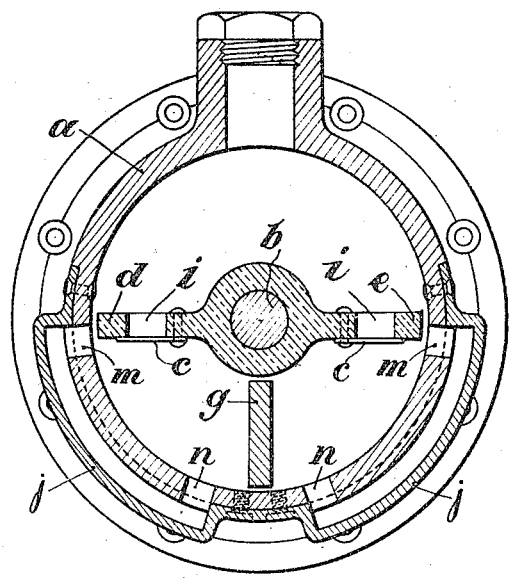

M. DERIHON.
SHOCK ABSORBER FOR MOTOR CARS AND OTHER VEHICLES.
APPLICATION FILED AUG. 6, 1917.

1,290,116.

Patented Jan. 7, 1919.

UNITED STATES PATENT OFFICE.

MARTIN DERIHON, OF OPENSHAW, MANCHESTER, ENGLAND.

SHOCK-ABSORBER FOR MOTOR-CARS AND OTHER VEHICLES.

1,290,116.

Specification of Letters Patent.  Patented Jan. 7, 1919.

Application filed August 6, 1917. Serial No. 184,727.

*To all whom it may concern:*

Be it known that I, MARTIN DERIHON, a subject of the King of Belgium, residing at Openshaw, Manchester, England, have invented certain new and useful Improvements in Shock-Absorbers for Motor-Cars and other Vehicles, of which the following is a specification.

This invention relates to shock absorbers for motor-cars and other suspended vehicles, said shock absorbers being of the kind described in my United States Patent No. 1068329 dated the 22nd day of July, 1913, the construction of the said shock absorber being such that it permits of the free compression and the free expansion of the suspension spring and exercises a retarding action only on the return movements toward the normal position. This retarding action is of a constant value in the two directions, however great may be the amplitudes of vibration of the suspension springs.

The said prior patent described how the above result could be attained by means of a cylinder or chamber filled with oil or other fluid and containing a piston or pistons or rotary blades, connected with the axle of the vehicle and arranged in such a manner as not to exercise any influence on the elastic compression and expansion of the springs, that is to say, on the relative displacements which occur between the chassis of the vehicle and the hub of the wheels when the latter encounter an unevenness or a depression in the road, but to retard the rapidity of the return movements toward normal position (which follow the said compression or the said expansion of the spring) and this with a constant resistance whatever may be the position taken by the piston or the blades.

The specification of the said Patent No. 1068329 particularly described an arrangement comprising valves carried by two blades in one piece, which are movable in relation to a fixed wall or partition in an oil cylinder in such a manner that either one or the other of the said valves opens according to the direction of displacement from the normal position of the spring. The portion of the cylinder between each of the two blades (placed in the normal position) and the fixed wall is bored to a diameter larger than that of the circumference described by the external edges of the blades, so as to allow the blade, which has been brought to that part, to oscillate without any resistance, while the other blade, thus engaged in the truly-bored portion of the cylinder, acts as a piston when the blade returns to the normal position.

The present invention relates to a modification of the above arrangement and consists in the fact that the passage of the oil from the chambers comprised between each of the blades and the fixed partition into the chamber inclosed between the two blades is effected by means of a conduit in or along one of the walls of the cylinder.

Figure 1 of the accompanying drawings is a section through a shock absorber according to the present invention.

Figure 2:
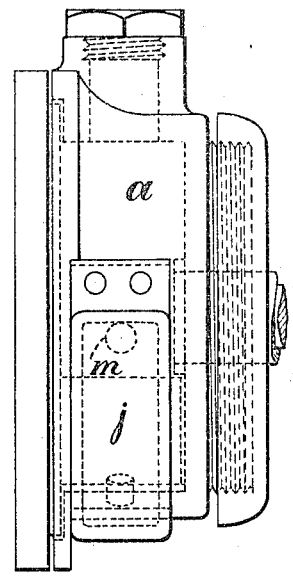

Fig. 2 is a side elevation.

The apparatus consists of an oil cylinder $a$ partitioned in the middle by a transverse partition or plate $g$. A double piston $e$—$d$ moves in the cylinder $a$ on one side and the other of the partition $g$, around pin $b$. Cylinder $a$ is fixed to the chassis of the vehicle, while the blades $e$—$d$ are connected with the axle by means of a lever and a suitable link gear.

Each of the pistons $e$ and $d$ has a drilled opening $i$; these openings $i$ are closed alternately by flaps or valves $c$ which can open downward.

In order to admit of the oil passing freely from one side to the other of the piston while the latter is moving away from the normal position, communication between the two compartments of the cylinder, when the blades approach the fixed partition $g$, is established by conduits in the walls of the cylinder. They are formed in the apparatus represented by openings $m$ and $n$ made in the cylindrical wall of the cylinder $a$, respectively near the edge of blades $e$ and $d$ when they are in their normal position and near the fixed partition $g$; a part or channel $j$ applied externally on cylinder $a$ causes the openings $m$ to communicate with the corresponding openings $n$.

From the above it follows that when the spring of the vehicle is compressed or expands, the blades $e$ and $d$ oscillate around pin $b$, and the valve $c$ of that blade which moves upward then opens, while the blade which moves downward opens the conduit establishing the communication between the two compartments of cylinder $a$.

In this manner, no retarding action is produced. On the contrary, during the return motion, the valve of the blade which redescends, closes and produces the retarding action. This retarding action is constant however large may be the displacement of the vanes.

Having fully described my invention, what I desire to claim and secure by Letters Patent is:—

A shock absorber for vehicles comprising a cylinder adapted to contain a fluid, a fixed partition therein, two piston blades movable in the cylinder relatively to the fixed partition, valves carried by the blades adapted respectively to open according to the direction of movement of the blades, and channel members applied to the outside of the cylinder and which provide ducts concentric to the cylinder to connect openings made in the circumferential wall of the cylinder between the normal position of the blades and the fixed partition.

In testimony whereof I have hereunto set my hand in presence of two subscribing witnesses

MARTIN DERIHON.

Witnesses:
CHAS. P. PRESSLY,
DOLPHY KAHN.